United States Patent [19]
Booth

[11] 3,767,135
[45] Oct. 23, 1973

[54] AUTOMATIC LOCKING SEAT BELT RETRACTOR

[75] Inventor: Frederick C. Booth, Birmingham, Mich.

[73] Assignee: Allied Chemical Corporation, New York, N.Y.

[22] Filed: July 9, 1971

[21] Appl. No.: 161,031

[52] U.S. Cl. ............................................ 242/107.4
[51] Int. Cl. ............................................. A62b 35/00
[58] Field of Search ................. 242/107 R, 107 SB, 242/107.4, 107.5, 107.6, 107.7; 297/388; 280/150 SB

[56] References Cited
UNITED STATES PATENTS

| | | | |
|---|---|---|---|
| 3,632,055 | 1/1972 | Stoffel................................ | 242/107.4 |
| 3,635,420 | 1/1972 | Romanzi, Jr...................... | 242/107.4 |
| 3,550,875 | 12/1970 | Settimi.............................. | 242/107.4 |
| 3,632,056 | 1/1972 | Hibbard............................ | 242/107.4 |
| 3,558,075 | 1/1971 | Stoffel............................... | 242/107.4 |

*Primary Examiner*—Werner H. Schroeder
*Attorney*—Jonathan Plaut

[57] ABSTRACT

A retractor for a seat belt includes a reel spring loaded so as to normally retract a seat belt section wound thereon. Mechanism is provided for first allowing the belt section to be extended by the wearer to any desired length and to then lock the reel against further extension. This mechanism includes a cam and follower operative to disable the extension lock after the belt has been almost fully retracted so as to ready the unit for the next extension. The cam consists of a plate supported for rotation with the reel axis and having a groove formed thereon with an inner spiral section, an outer spiral section and an intermediate section connecting the two spirals and having a steeper radial projection than do the spiral sections. A cam follower has one end set in the groove and release of the extension lock is controlled by radial movement of the follower along the track, as it moves through the intermediate section of the groove.

The reel is locked against extension by a cam-controlled pawl which cooperates with a ratchet fixed to the reel. A clutch moved by the reel urges the cam to move the ratchet away from the pawl during reel retraction to eliminate the annoying click of the pawl on the reel.

5 Claims, 9 Drawing Figures

PATENTED OCT 23 1973 3,767,135
SHEET 1 OF 2
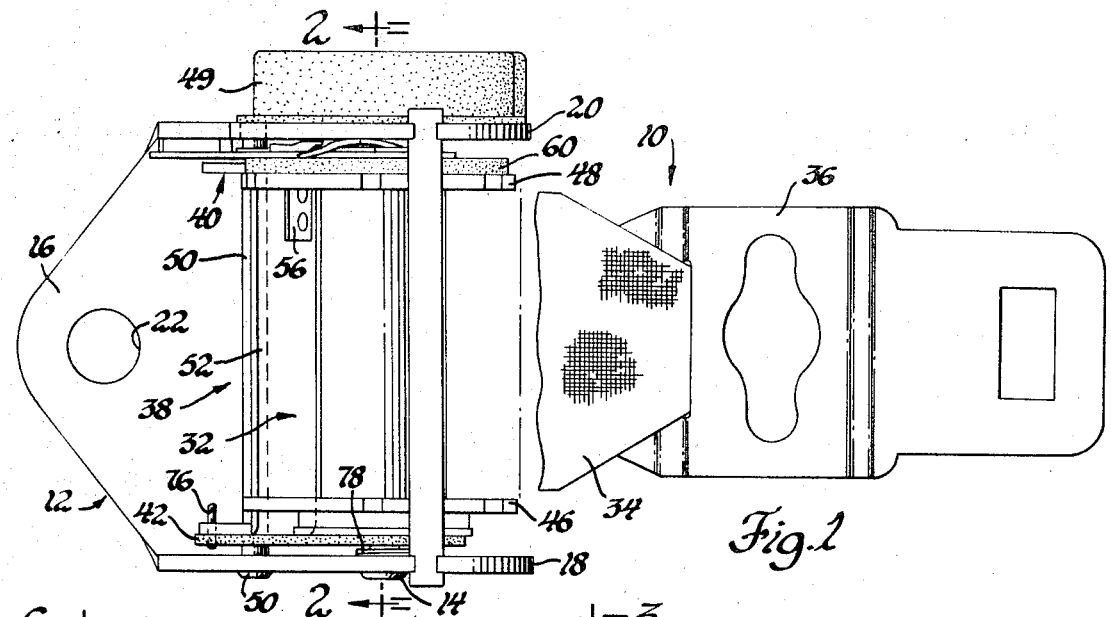
Fig.1
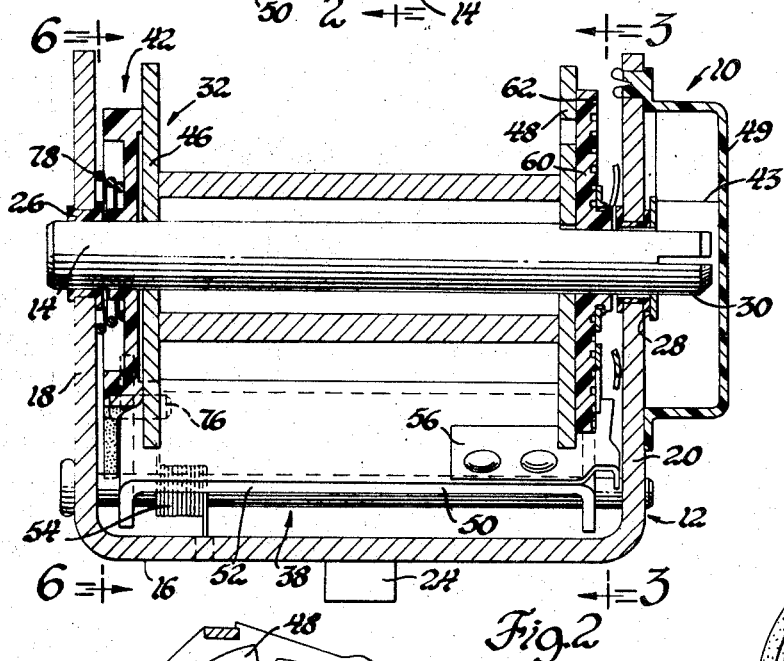
Fig.2
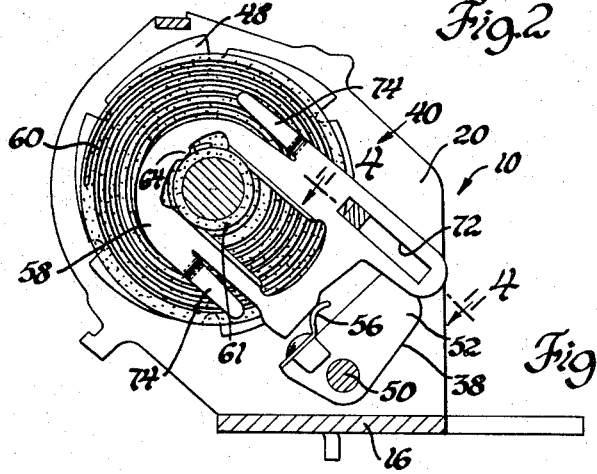
Fig.3
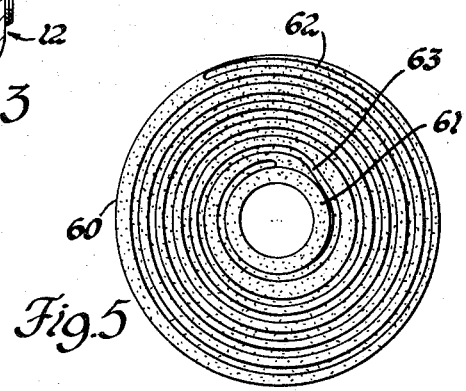
Fig.4
Fig.5
INVENTOR.
Frederick C. Booth
BY
Barnard, McGlynn & Reising
ATTORNEYS

AUTOMATIC LOCKING SEAT BELT RETRACTOR

BACKGROUND OF THE INVENTION

1. Field of the Invention

This invention relates to a reel type seat belt retractor having means for locking the retractor against further extension after the termination of the initial extension of the belt from the reel and particularly to improved mechanism for disabling the extension lock of such retractor when it is substantially at a fully retracted position and for disabling the lock mechanism during retraction of the belt so as to eliminate riding of the locking pawl over the ratchet.

2. Prior Art

United States Patent application Ser. No. 2,564 entitled "SEAT BELT RETRACTOR," assigned to the assignee of the present invention, discloses a retractor wherein the seat belt section is wound about a reel which is spring loaded in the retracting direction. Locking mechanism is provided for preventing further extension of the reel after an initial extension of the seat belt to any desired length. This mechanism includes a ratchet attached to the reel and a pawl operative to engage the ratchet to prevent extension of the reel when it is released. The pawl is moved to a disengaged position with respect to the ratchet when a predetermined amount of belt has been wound about the reel by a follower having one end riding in a groove formed on a plate supported by one of the reel end plates. The groove consists of a continuous spiral and the end of the follower rides in the groove so that the follower is gradually moved axially with respect to the reel as the reel rotates. When the follower reaches a predetermined axial position during extension of the belt, it disengages from the pawl so as to eliminate its interference with the pawl moving toward the ratchet. However, until the initial extension has terminated and the reel has retracted through a small angular interval, a cam mechanism which is driven by a frictional clutch attached to the reel prevents the pawl from falling against the ratchet. When the initial extension terminates and a small retraction takes place, the pawl is allowed to move into a position wherein it is forced against the ratchet upon the next extending rotation of the reel through a small angular interval.

The retractor thus described and claimed in the aforementioned patent application, provides less than fully satisfactory operation in two respects and it is the object of the present invention to provide a modified version of that retractor which operates in a more satisfactory manner in these respects.

One of the problems associated with the operation of the previous retractor relates to the precision of the device in disabling the extension locking mechanism during a full retraction and reenabling the locking mechanism during the first extension. When the mechanism operates from the axial motion of the follower along the spiral groove the point of actuation of the mechanism with respect to the extended length of the belt is highly sensitive to the exact dimensions and configuration of the follower and the spiral mechanism. Because a relatively large rotational motion of the cam produces only a small axial motion of the follower it was found that the retractors in a production run would vary relatively widely from one another with regard to the point at which the pawl would be freed relative to the extended length of the belt.

Another problem had to do with the angular interval through which the reel must move during a second extension before the ratchet will engage the pawl. It is clearly desirable that this angle be kept to a minimum to prevent loosening of the belt about the passenger during a collision. However, in the previous design this requirement was antethetical to the need to prevent the ratchet from riding on the pawl during retraction to avoid unnecessary noise.

SUMMARY OF THE PRESENT INVENTION

The present invention contemplates an improved retractor which obviates both of these problems in a simple, economical, and highly reliable manner. First, the present retractor employs a follower actuating groove which takes the form of an inner spiral, an outer spiral and a short connecting section. The short connecting section has a substantially sharper radial inclination than do the two spiral sections. Thus, for a given rotation of the reel the follower moves through a substantially greater distance in the radial direction when it is tracking through the connecting section than it does while in the inner or outer groove. The mechanism is adjusted so that this relative sharp radial movement through the connecting section actuates and deactuates the extension locking mechanism. Thus, production models of the improved retractor all engage and disengage the extension locking mechanism at about the same point in rotation of the reel independent of minor production variations in the dimensions of the follower.

In order to achieve substantially instantaneous locking of the reel after the ratchet has been released on the initial retraction following extension, the cam has been modified so as to allow the pawl to fall against the ratchet under spring pressure, upon the release of the holding mechanism bY a retracting motion. However, continued retracting motion causes force to be exerted on the pawl through the sprIng clutch which causes the pawl to back away from the ratchet, allowing retraction without the annoyable clicking noise. As soon as the retracting motion stops, the spring overcomes the slip clutch force and brings the pawl back into contact with the ratchet.

Other objectives and advantages of the present invention will be made apparent by the following detailed description of the preferred embodiment of the invention.

The description makes reference to the accompanying drawings, in which:

FIG. 1 is a plan view of a preferred embodiment of the instant invention;

FIG. 2 is an enlarged cross-sectional view taken substantially along lines 2—2 of FIG. 1;

FIG. 3 is a cross-sectional view taken substantiuly along lines 3—3 of FIG. 2;

FIG. 4 is a fragmentary cross-sectional view taken substantially along lines 4—4 of FIG. 3;

FIG. 5 is a side view of the spiral cam;

Referring now to the drawings wherein like numerals indicate like or coresponding parts throughout the several views a retracting reel assembly constructed in accordance with the instant invention is generally shown at 10.

Figure 6:
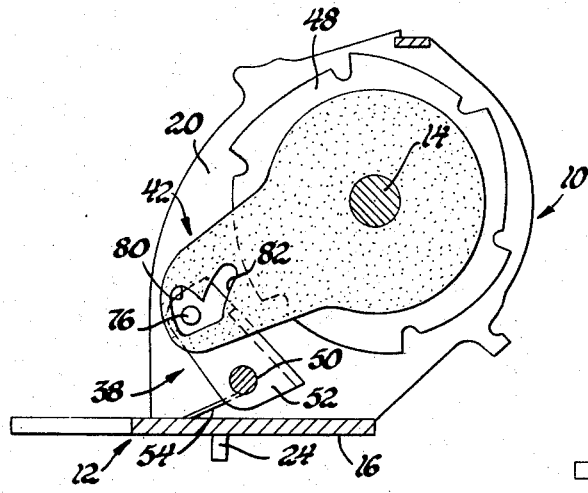
FIG. 6 is a cross-sectional view taken substantially along lines 6—6 of FIG. 2 showing the assembly in the fully retracted position.

The assembly 10 includes a support means defined by a generally U-shaped bracket generally indicated at 12 and a shaft 14. The U-shaped bracket 12 has a base 16 and parallel side walls 18 and 20. The base 16 has a hole 22 therethrough and a tab 24 extending downwardly therefrom for attaching the support bracket to the floor of a vehicle or the like. The shaft 14 is rotatably supported by the side walls 18 and 20 through the bushings 26 and 28. The shaft 14 has a flat portion 30 which extends through and is rotatable in the bushing 28.

The assembly also includes a reel means generally shown at 32 rotatably supported by the shaft 14 for rotation relative to the support bracket 16.

An elongated flexible seat belt element 34 is connected to the reel means 32 and is adapted to be wound thereon and unwound therefrom. The seat belt 34 is connected to a tongue 36 by being looped through an opening therein and the tongue 36 is adapted to be connected to a buckle assembly.

Figure 7:
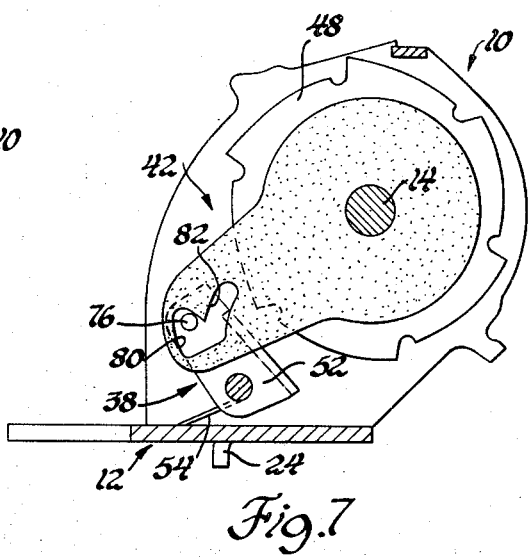
FIG. 7 is a view similar to FIG. 6 showing the position of the components during initial unwinding of the seat belt.
Figure 8:
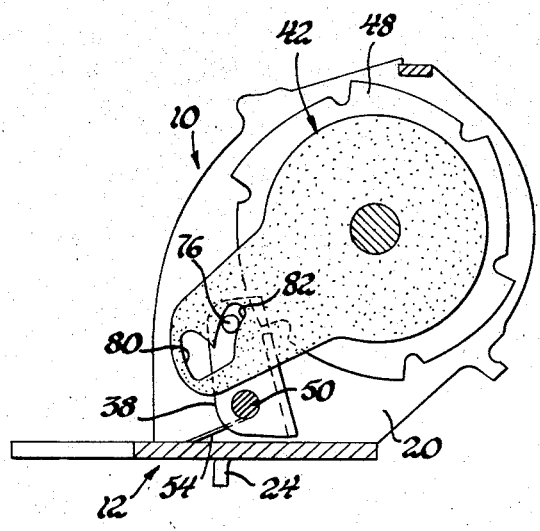
FIG. 8 is a view similar to FIGS. 6 and 7 but showing the components of the assembly in the position assumed after the seat belt has been fully retracted followed by a slight retraction.

The assembly also includes locking means generally indicated at 38 and supported by the support bracket 16 for movement between a locked position, as shown in FIG. 8, for preventing rotation of the reel means 32 and an unlocked position, as shown in FIGS. 1 through 3, 6 and 7, for allowing rotation of the reel means 32.

Also included is a holding means generally shown at 40 and engageable with the locking means 38 for preventing the locking means 38 from moving to the locked position during initial unwinding of the seat belt 34 from the reel means 32.

Further, there is included actuator means generally indicated at 42 and responsive to rotation of the reel means 32 for moving the locking means 38 to the locked position upon a slight winding rotation of the reel means 32.

The reel means 32 includes a cylinder 44 disposed concentrically about the shaft 14 and a pair of circular plate-like ratchet members 46 and 48. The ratchet members 46 and 48 are secured to opposite ends of the cylinder 44. The ratchet member 48 has a hole therein which conforms to the end of the shaft 14 having the flat portion 30. The ratchet members 46 and 48 are therefore supported by the shaft 14 for rotation relative to the U-shaped bracket 16 in that the shaft 16 is rotatably supported in the side walls 18 and 20 of the support bracket 16. Although not shown, the cylinder 44 has a slot extending therealong and the flexible seat belt element 34 is connected to the shaft 14 and is looped thereabout and extends through the slot to be wound and unwound about the cylinder 44 between the ratchet members 46 and 48.

The reel means 32 also includes a biasing means comprising a band-type spring 47 which is attached at one end in a slot in the end of the shaft 14 and is attached at the other end to a housing 49 which is in turn secured to the side wall 20 of the support bracket 16. The spring 47 urges the reel means to rotate in a winding direction.

The locking means 38 includes a pin 50 extending between and supported by the side walls 18 and 20 of the support bracket 16. The locking means also includes the locking pawl 52 which is rotatably supported by the pin 50 for movement between the locked and unlocked positions. The locking pawl 50 comprises a plate-like member extending between the walls of the support bracket 16 and rearwardly extending flanges through which the pin 50 extends. A biasing means comprising the spring 54 urges the locking pawl 52 toward the locked position. Also included is a tab 56 secured to the locking pawl 52.

The holding means includes a follower member 58 movable between a first position as illustrated in FIG. 3 engaging the tab 56 of the locking means and a second position out of engagement with the tab 56 of the locking means. The holding means also includes a cam member 60 responsive to rotation of the reel means 32 for moving the hold-out member 58 from the first position illustrated in FIG. 3 toward the second position during unwinding rotation of the reel means 32 and in the opposite direction during winding rotation of the reel means 32. The cam 60 is a circular member disposed for rotation with the ratchet member 48. The cam 60 has an opening therethrough which conforms to the end of the shaft 14 having a flat portion 30 so as to be rotatable with the shaft 14 and therefore rotatable with the ratchet members 46 and 48. The cam 60 includes a groove disposed about the axis of the shaft 14.

The groove consists of a relatively short spiral innersection 61, a longer spiral outer section 62, and a relatively short connecting section 63 which has a greater radial projection per unit length than do either the sections 61 or 62.

The follower member 58 includes a bent out tab 64 disposed in the cam track 61, 62 and 63 for moving the follower 58 radially relative to the axis of the shaft 14 during winding and unwinding rotation of the reel means 32. The follower 58 has an elongated opening therein with flanges 66 on either side thereof with the elongated opening disposed about the shaft 14. The input member 60 has an outwardly extending collar 68 with an annular groove therein in which the flanges 66 are slidably disposed. A peg 70 extends from the side wall 20 and into a slot 72 in the hold-out member 58 so as to interconnect the follower 58 and the adjacent side wall 20 for preventing the follower 58 from rotating about the axis of the shaft 14. The follower 58 is preferably made of a thin sheet metal or plastic and includes the spring-like tabs 74 to urge the hold-out member 58 against the face of the cam member 60.

As is clear from the foregoing description, upon rotation of the reel means 32 the cam 60 rotates so that the follower 58 will move radially because of the spiral orientation of the cam track in which it is disposed.

When the tab 64 is disposed in either the inner spiral section 61 of the groove or the outer spiral section 62 the axial motion of the follower 58 per unit revolution of the cam 60 is relatively small. When the tab 64 is disposed within the short connecting section 63 of the groove the follower 58 undergoes a relatively sharp radial motion during rotation of the reel. Thus, the functions of the inner and outer spiral sections 61 and 62 are simply to maintain the tab in position to move into the connecting circuit 63 and achieve the results of a relatively great radial movement, at an appropriate point of rotation of the reel.

The locking means 38 includes a projection 76. The actuation means 42 comprises a plate-like clutch member 42 supported coaxially with the reel means 32 for rotation about the axis of the shaft 14. The clutch member 42 is rotatably disposed on the shaft 14. The clutch member 42 is also in frictional driven engagement with the ratchet member 46 and a biasing means comprising the coil spring 78 urges the clutch member 42 into frictional engagement with the ratchet member 46.

The clutch member 42 has a slot therein through which the projection 76 extends. The slot has a first leg 80 which is disposed about the projection 76 as the clutch member 42 moves in response to initial unwinding rotation of the reel means 32 to prevent the locking pawl 52 from moving toward the locked position. The slot also has a second leg 82 which is disposed about the projection 76 as the clutch member 42 moves in response to the slight winding rotation followed by the unwinding rotation of the reel means 32 to move the locking pawl 52 to the locked position illustrated in FIG. 8. The slot is generally V-shaped with the legs 80 and 82 thereof diverging from one another from an apex, the apex having a slightly flattened portion at the bottom as illustrated in FIGS. 6 through 9.

The clutch member 42 is mounted about the shaft 14 and in frictional engagement with the ratchet member 46 so as to rotate with the ratchet member 46 of the reel means 32 during retracting rotation of the reel means to urge the apex of the slot into engagement with projection 76. The first leg 80 of the slot extends generally along an arc having a center coincident with the axis of rotation of the reel means, i.e., the axis of the shaft 14. The second leg 82 of the slot is extended at an angle to the first leg and accommodates the forward movement of the projection 76 resulting from movement of the locking pawl 52 in the locking direction as well as counterclockwise rotation of the clutch plate 42 as viewed in FIGS. 6 through 9.

In the operation of the assembly, the assembly is normally in the fully retracted position illustrated in FIGS. 1 through 3 and 6. In this position, the follower 58 engages the tab 56 to hold the locking pawl 52 out of engagement with the teeth in the ratchet members 46 and 48, i.e., the unlocked position. When the locking pawl 52 is held in this position, the projection 76 thereof is in the position illustrated in FIG. 6. Upon unwinding of the seat belt therefrom, the clutch member 42, because of its frictional driven engagement with the ratchet member 46, rotates in the counterclockwise direction as illustrated in FIG. 6 so as to move the first leg 80 of the slot about the projection 76. At the same time, the coaction between the tab 64 and the connecting cam track section 63 moves the follower 58 radially inwardly and out of engagement with the tab 56; however, before moving out of engagement with the tab 56; the clutch member 42 has moved to the position illustrated in FIG. 7 where the leg 80 of the slot coacts with the projection 76 to maintain the locking pawl 72 in the unlocked position.

The components will remain in the position shown in FIG. 7 so long as the seat belt is being extended from the assembly. Once extending movement of the seat belt is stopped, however, and there is a slight rewinding, the clutch member 42 will move in the clockwise direction to the position illustrated in FIG. 8, allowing the spring 54 to move the pawl 52 into engagement with the ratchets 46 and 48, preventing subsequent extending movement of the seat belt.

Figure 9:
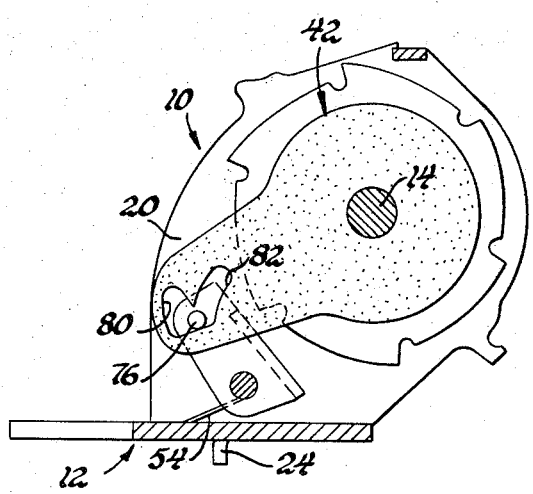
FIG. 9 is a view similar to FIGS. 6 through 8 but showing the components in the positions they assume during retraction of the reel after the seat belt has been initially extended.

Subsequent retracting rotation of the reel will cause the clutch member 42 to move in a clockwise direction so as to move the pawl 52 away from the members 46 and 48 against the force of the spring 54 as seen in FIG. 9, to prevent the pawl from clicking on the ratchet during retraction. When the retracting motion terminates the force of the spring 54 acting through the projection 76 moves the member 42 counterclockwise into the position shown in FIG. 8 wherein the pawl 52 rests against the ratchets to prevent appreciable extension of the belt.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

Having thus described my invention, I claim:

1. In a retractor for a seat belt including a reel having one end of the seat belt attached thereto, spring means biasing the reel toward rotation so as to retract the seat belt and locking means provided with a pawl having a tab secured thereto and adapted for movement between locked and unlocked positions for respectively preventing and allowing rotation of the reel, the improvement comprising disabling means engageable with said tab of said locking means for preventing said locking means from moving to said locked position when the reel is in a rotational position which is within a predetermined rotation of the position wherein the belt is fully retracted, the disabling means including a cam adapted for rotation with the reel and a cam follower adapted for movement into and out of engagement with said tab of said locking means, the cam including a groove having an inner section formed about the axis of rotation of the cam, an outer section formed about the axis of rotation of the cam and an intermediate connecting section having a substantially greater radial inclination than either the inner or outer sections and said cam follower having a tab disposed in said groove whereby the radial movement of the cam follower per revolution of the reel is substantially greater when said follower is in said intermediate section than when it is in said inner or said outer sections, such radial movement of said tab of said cam follower within said connecting section acting to move said cam follower into and out of engagement with said tab of said locking means.

2. The retractor of claim 1 wherein said groove is formed in a plate and the inner and outer sections thereof have a spiral configuration.

3. The retractor of claim 2 wherein the plate is supported on the side of the reel and rotates about the main axis of the reel, whereby the motion of the follower is radial with respect to the reel.

4. The retractor of claim 1 wherein said disabling means is connected to the follower so as to be actuated as the follower rides through said connecting section.

5. The retractor of claim 1 wherein said means for locking the reel against the belt extending rotation includes a ratchet affixed to said reel, a pawl pivotable into and out of engagement with the ratchet, means for biasing the pawl into locked engagement with the ratchet, and means for urging the pawl away from the ratchet, against the spring bias during belt retracting motion of the reel.

* * * * *